US007672011B2

(12) United States Patent
Kato et al.

(10) Patent No.: US 7,672,011 B2
(45) Date of Patent: Mar. 2, 2010

(54) IMAGE RECORDING SYSTEM, IMAGE DATA RESOURCE APPARATUS, IMAGE RECORDING APPARATUS, IMAGE PROCESSING METHOD, AND PROGRAM

(75) Inventors: Masao Kato, Kanagawa (JP); Tomoyuki Watanabe, Tokyo (JP); Akitoshi Yamada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1093 days.

(21) Appl. No.: 10/375,148

(22) Filed: Feb. 28, 2003

(65) Prior Publication Data

US 2003/0174345 A1    Sep. 18, 2003

(30) Foreign Application Priority Data

Mar. 15, 2002    (JP)    ............................. 2002-072145

(51) Int. Cl.
*G06K 15/02* (2006.01)
(52) U.S. Cl. ..................... 358/1.2; 358/1.9; 358/3.06; 358/3.07; 358/3.1; 382/163; 382/164
(58) Field of Classification Search .................. 358/1.2, 358/1.9, 3.06, 3.07, 3.1; 382/163, 164, 165, 382/166, 167
See application file for complete search history.

(56) References Cited

U.S. PATENT DOCUMENTS

| | | | | |
|---|---|---|---|---|
| 4,578,714 A * | 3/1986 | Sugiura et al. | ............. | 358/3.01 |
| 5,742,405 A * | 4/1998 | Spaulding et al. | ............ | 358/3.1 |
| 5,917,963 A * | 6/1999 | Miyake | ....................... | 382/300 |
| 6,172,766 B1 * | 1/2001 | Honma | ....................... | 358/1.2 |
| 6,344,901 B1 * | 2/2002 | Simon et al. | .................. | 358/1.9 |
| 6,771,392 B1 * | 8/2004 | Ebner | ......................... | 358/3.07 |
| 6,798,538 B1 * | 9/2004 | Yamada et al. | ............... | 358/1.9 |
| 6,804,030 B1 * | 10/2004 | Walmsley et al. | .......... | 358/3.07 |
| 6,956,671 B2 * | 10/2005 | Monty et al. | ................. | 358/1.9 |
| 7,068,391 B2 * | 6/2006 | Dewitte et al. | ............... | 358/1.9 |
| 7,126,722 B2 * | 10/2006 | Ino et al. | .................... | 358/3.07 |
| 2002/0036643 A1 * | 3/2002 | Namizuka et al. | ............ | 345/555 |
| 2002/0163654 A1 * | 11/2002 | Levantovsky | ............... | 358/1.2 |

FOREIGN PATENT DOCUMENTS

| | | |
|---|---|---|
| EP | 0 724 356 | 7/1996 |
| EP | 0 996 280 | 4/2000 |
| EP | 1 202 556 | 5/2002 |

\* cited by examiner

*Primary Examiner*—David K Moore
*Assistant Examiner*—Benjamin O Dulaney
(74) *Attorney, Agent, or Firm*—Fitzpatrick, Cella, Harper & Scinto

(57) ABSTRACT

A printer driver of a Non-PC controls to quantize image data at quantization resolution (resolution 1), convert the quantized data into data resolution (resolution 2), and then transfer the data of the data resolution to an engine unit of an image output apparatus. The engine unit converts the data resolution of the received data into recording resolution (resolution 3) for a recording medium. Here, the quantization resolution is set to be lower than the data resolution. Thus, processing loads in the image processing unit can be reduced, whereby it is possible to provide image output capable of maintaining image quality and speed even under the circumstance that there is no sufficient memory and high-speed CPU, and to provide image output capable of maintaining image quality and speed according to a matrix recording method flexibly coping with various environments and minimizing the load in the engine unit.

10 Claims, 12 Drawing Sheets

FIG. 3

| OUTPUT VALUE LEVELS OF 300dpi ERROR DIFFUSION | OUTPUT LEVELS OF 600dpi UNIT | OUTPUT LEVELS OF 1200×600dpi UNIT |
|---|---|---|
| 0 | 0 0 / 0 0 | 0 0 0 0 / 0 0 0 0 |
| 1 | 1 0 / 0 0 | 1 0 0 0 / 0 0 0 0 |
| 2 | 1 0 / 0 1 | 1 0 0 0 / 0 0 1 0 |
| 3 | 1 1 / 0 1 | 1 0 1 0 / 0 0 0 1 |
| 4 | 1 1 / 1 1 | 1 0 1 0 / 0 1 0 1 |
| 5 | 2 1 / 1 1 | 1 1 1 0 / 0 1 0 1 |
| 6 | 2 1 / 1 2 | 1 1 1 0 / 0 1 0 1 |
| 7 | 2 2 / 1 2 | 1 1 1 1 / 0 1 1 1 |
| 8 | 2 2 / 2 2 | 1 1 1 1 / 1 1 1 1 |

FIG. 12

| | PROC RESOLUTION IN HOST | QUANTIZATION LEVEL OF EACH PROC PIXEL | RECORDING DOT LAYOUT AT 300ppi |
|---|---|---|---|
| (A) HIGH RESOLUTION PROC | 600ppi | 2 | 16 KINDS |
| (B) MATRIX PATTERN PROC | 300ppi | 5 | 5 KINDS — LEVEL 0, LEVEL 1, LEVEL 2, LEVEL 3, LEVEL 4 | ially allocated to "0" to "4" of the number of dots applied to
IMAGE RECORDING SYSTEM, IMAGE DATA RESOURCE APPARATUS, IMAGE RECORDING APPARATUS, IMAGE PROCESSING METHOD, AND PROGRAM

BACKGROUND OF THE INVENTION

1. Field of the Invention

The present invention relates to an image recording system, an image data resource apparatus, an image recording apparatus, an image processing method and a program for the image processing method each of which uses a matrix pattern process to expand image data into recording data corresponding to a predetermined dot matrix and record an image on a recording medium by using plural recording elements, and more particularly, to an image recording system, an image data resource apparatus, an image recording apparatus, an image processing method and a program for the image processing method each of which can provide a high-quality image at high speed.

2. Related Background Art

Conventionally, in a recording apparatus which records an image on a recording medium such as a paper or the like, it is intended to increase resolution of image data because a high-quality image is demanded. However, according as the resolution of the image data increases, an amount of data to be processed increases. For this reason, for example, there is a problem that a data processing time of a host computer (host apparatus, host PC (personal computer)) for transferring the image data to cause the recording apparatus (printer) to record the image, a transfer time of the image data from the host computer to the recording apparatus and the like are prolonged.

Incidentally, a matrix recording method which has been conventionally known is provided to solve the above problem. That is, in this matrix recording method, the image data processed by the host PC at relatively low resolution in higher-value quantization is transferred to the printer having plural recording elements (nozzles), and the received image data is expanded into recording data corresponding to a predetermined dot matrix and then printed by the printer. An example of the matrix recording method will be explained with reference to FIG. 12. As the processes in the host PC, FIG. 12 shows a case (A) of performing a high-resolution process (600 ppi) and a case (B) of performing a matrix pattern process (300 ppi). Here, it should be noted that "ppi" indicates "pixels per inch".

In the case (A) of performing the high-resolution process, if the image data is quantized with two levels in relation to 600 ppi, the recording is performed in units of four dots in relation to 300 ppi, and an actual recording dot layout includes 16 unit layouts as shown in FIG. 12. Then, the substantial density level of these 16 kinds of layouts can be treated as same as the case of the number of dots applied to a 300 ppi lattice structured in units of four dots, and thus includes five levels. On the other hand, in the case (B) of performing the matrix pattern process, the image data is quantized with five levels in relation to 300 ppi, and the these quantization levels are respectthe 300 ppi lattice structured in units of four dots as shown in FIG. 12. Therefore, even if the data amount decreases, gradation expression same as the recording result in the high-resolution process can be achieved.

In recent years, the resolution of the printer becomes higher, whereby the printer can form a larger number of dots than ever before. For this reason, the number of pixels to be recorded increases, and also the printer itself has a larger number of nozzles to improve print speed, whereby the above matrix recording method becomes important more than ever.

On one hand, recently, in case of performing image printing by a printer, a demand for doing so without using any PC increases. That is, as a system for enabling a user to easily use the Internet by one's side, various systems such as a WebTV™ system (service for connecting with the Internet by using TV (television)), a set-top box (terminal device attached to TV for connecting with the Internet), and the like in which an Internet function is added to a general TV are known. In this connection, a demand for causing the printer to print the image from such a so-called Non-PC system (system not using PC) increases.

On one hand, according to popularization of a digital camera, a demand for causing so-called a photo-direct (PD) printer or the like to store image data from the digital camera in a recording medium such as a CompactFlash™ (CF) card or the like, read the image data stored in the CF card through a card slot provided on the printer side, and then directly print the read image data without using any host PC increases. Moreover, a PD print system which causes the PD printer to perform the printing without using any recording medium has been achieved. That is, in the PD print system, the PD printer directly captures the image data from the digital camera through Universal Serial Bus (USB) or the like, converts the captured image data into data capable of being recorded on the PD printer side, and then actually prints the converted data.

The above PD printer includes an image processing function called a controller unit. Thus, various processes such as image rendering, rasterizing, color conversion, quantization, print control command generation and the like which are ordinarily performed on the host PC side are all performed on the controller unit side, and the processed data is then transferred from the controller unit to an engine unit. Then, the engine unit reads the transferred data, analyzes a print control command and print data from the read data, and thus performs mechanical control such as paper feeding control, carriage movement control and the like necessary to actually record the image on the recoding medium. Moreover, the engine unit performs control to apply a driving pulse to a recording head, control to transmit the data to the recording head, and the like. Here, it should be noted that the above control in the engine unit is the same as the control to be performed in a conventional case where the data from the host PC is received by the engine unit.

The general PD printer is often designed to add the controller unit on the printer being the base. Thus, in the printer designed as above, the controller unit is connected with the engine unit of the printer itself through an internal bus so that the data to be processed inside the engine unit may include not only the data sent from the controller unit but also the data processed and sent from the host PC, thereby achieving the printing.

However, it is apparent that the Non-PC system and the PD printer to which the demand increases in recent years have the following problems.

(1) Problems in Non-PC System

According as the performance of the PC increases in recent years, a printer driver on the PC is designed to be able to perform a process at satisfactory processing speed with high quality in an environment having an sufficient memory of several tens of megabytes (MB) and a high-speed CPU of gigahertz (GHz). On the other hand, since the Non-PC system such as the WebTV™ system, the set-top box or the like does not necessarily have the large-capacity memory and the high-speed CPU as above, if the process to be performed by the printer driver on the PC is applied to this system as it is, the problem that the image quality and speed same as above cannot be maintained occurs.

Moreover, even if the above matrix recording method is intended to be applied to solve this problem, in fact, it is too various and uncertain to assume beforehand methods for expanding the matrix patterns corresponding to the operation environments in the various Non-PC systems and prepare the assumed methods in the engine unit of the printer, whereby the problem that the engine unit of the printer suffers from excessive loads occurs. Therefore, it is thought that the above matrix recording method cannot be applied as a matter of fact.

Moreover, the resolution of the image data to be handled is different in relation to each Non-PC system. Thus, although achieved on the printer driver of the PC, the process cannot be necessarily achieved at the resolution required by a user. For this reason, the image output from the printer which can be achieved on the PC cannot be necessarily achieved on the Non-PC system. In the worst case, the problem that it is impossible to perform the printing might occur.

(2) Problems in PD Printer System

As well as the Non-PC system, it is impossible in the controller unit of the PD printer system to expect the large-capacity memory and the high-speed CPU as provided in the PC because these parts remarkably raise the cost. Thus, if the process to be performed by the printer driver on the PC is applied to this system as it is, the problem that the image quality and speed same as above cannot be maintained occurs. As a matter of fact, in the various PD printer systems which are currently commercialized, the products each of which can maximally utilize the print speed of the engine unit of its printer are few due to the problem of processing loads in the controller unit.

Moreover, even if the above matrix recording method is applied to solve this problem, it is necessary to previously incorporate a PD-dedicated specification in the engine unit of the printer being the base. However, this is the excessive specification for a simple body of this base printer, whereby the problem that such a specification might come to affect a program storage unit and the like occurs.

Particularly, in a case where the base printer has been already commercialized, the PD printer on which the controller unit is added cannot achieve in this controller unit the processing speed at the data resolution receivable by that printer, whereby the problem that the print speed inherent in the engine unit cannot be sufficiently satisfied occurs.

In summary, the system, which is expected to be further popularized in future, for outputting the image data from the devices other the PC to the printer roughly has the following two problems, that is, (1) if the process of the printer driver performed on the PC is directly applied as it is, the image quality and the speed (general speed including image processing speed, data transfer speed, and print speed) cannot be maintained because the load of the image processing unit in the printer increases, and (2) the operation environments for applying the matrix recording method to solve the above problem (1) are various, whereby it is difficult to entirely contain the appropriate matrix recording method within the printer engine.

SUMMARY OF THE INVENTION

The present invention is made in consideration of the above problems, and an object thereof is to provide an image recording system, an image data resource apparatus, an image recording apparatus, an image processing method and a program for the image processing method which can reduce processing loads in an image processing unit, thus achieve an image output as maintaining image quality and speed even under the circumstances of no sufficient memory and no high-speed CPU, and further minimize loads in an engine unit as flexibly coping with various environments.

In order to achieve the above object, an image recording system according to the present invention is characterized by comprising: a quantization means for quantizing image data at first resolution; a data conversion means for converting the quantization data of the first resolution quantized by the quantization means into the data of second resolution; and a transfer means for transferring the data of the second resolution converted by the data conversion means to an engine unit for controlling an image recording operation to a recording medium, wherein the first resolution and the second resolution are different from each other.

Moreover, an image data resource apparatus according to the present invention is characterized by comprising: a quantization means for quantizing image data at first resolution; a data conversion means for converting the quantization data of the first resolution quantized by the quantization means into the data of second resolution; and a transfer means for transferring the data of the second resolution converted by the data conversion means to an engine unit for controlling an image recording operation to a recording medium, wherein the first resolution and the second resolution are different from each other.

Moreover, an image recording apparatus according to the present invention is characterized by comprising: a quantization means for quantizing image data at first resolution; a data conversion means for converting the quantization data of the first resolution quantized by the quantization means into the data of second resolution; and a transfer means for transferring the data of the second resolution converted by the data conversion means to an engine unit for controlling an image recording operation to a recording medium, wherein the first resolution and the second resolution are different from each other.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a diagram showing a data expansion pattern form at each resolution, according the first embodiment;

FIG. 12 is a diagram showing a high-resolution process and a matrix pattern process according to a matrix recording method.

The accompanying drawings, which are incorporated in and constitute a part of the specification, illustrate the embodiments of the present invention and, together with the description, serve to explain the principles of the present invention.

DETAILED DESCRIPTION OF THE PREFERRED EMBODIMENTS

The preferred embodiments of the present invention will now be described in detail in accordance with the accompanying drawings.

First of all, the outline of the present invention will be explained prior to the explanations of the embodiments. That is, the present invention is to provide a high-quality image at high speed in a recording apparatus which records an image on a recording medium by using plural recording elements. Here, various recording elements according to recording methods can be used as the recording elements. For example, in case of using an ink-jet recording method, it is possible to adopt an ink-jet recording element having nozzles from which various recording inks are respectively discharged through ink discharge openings. Moreover, in this case, it is possible to discharge not only the recording inks but also an image-quality improver for encapsulating or adhering coloring materials included in the recording inks. Furthermore, the present invention is applicable to entire hardware which uses recording media such as paper, cloth, leather, unwoven cloth, and moreover metal. More specifically, the present invention is applicable to business equipment including a printer, a copying machine, a multifunctional machine, a facsimile machine and the like, industrial production equipment, and the like. Hereinafter, the embodiments of the present invention will be explained in detail with reference to the attached drawings.

First Embodiment

Figure 1:
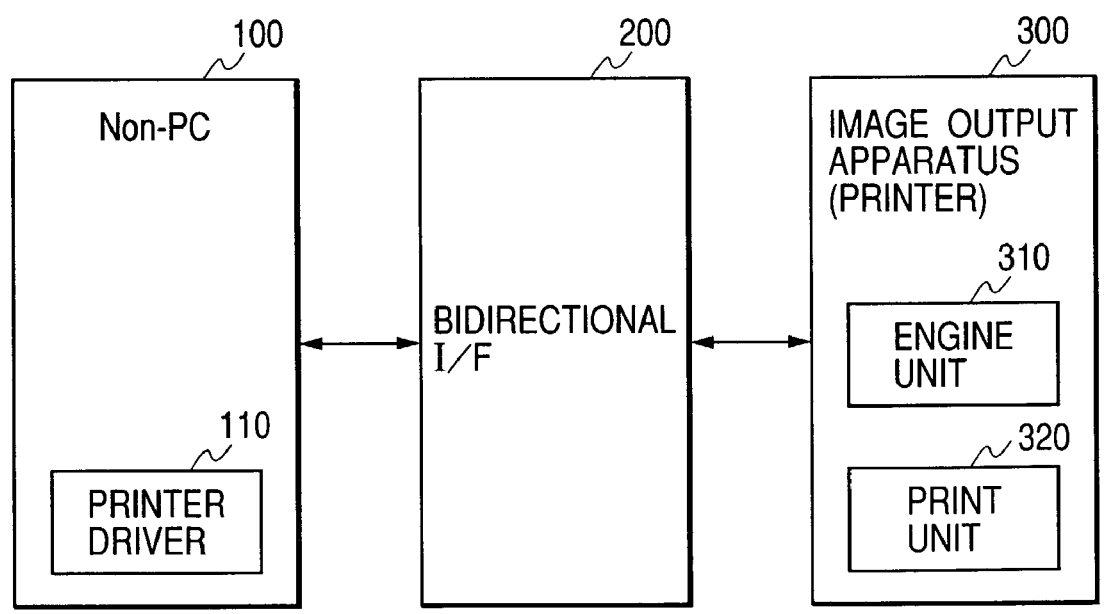
FIG. 1 is a block diagram showing the structure of an information processing system according to the first embodiment of the present invention.

First, the structure of an information processing system according to the first embodiment of the present invention will be explained with reference to FIG. 1. FIG. 1 is the block diagram showing the structure of the information processing system according to the first embodiment. The information processing system includes a Non-PC 100, a bidirectional interface (I/F) 200, and an image output apparatus 300 consisting of a printer and the like. Here, it should be noted that the image output apparatus 300 may be called a printer 300 hereinafter. The Non-PC 100 and the image output apparatus 300 are connected with each other through the bidirectional I/F 200. The Non-PC 100 is the apparatus such as a WebTV™ system, a set-top box or the like which does not use a PC, and a printer driver 110 is installed as the memory of the Non-PC 100. Moreover, the image output apparatus 300 includes an engine unit 310 which performs an image process and a print unit 320 which performs printing on the recording medium.

Next, how to generate print data in the information processing system according to the first embodiment will be explained with reference to FIGS. 2 to 5. As described above, the first embodiment is directed to the example that the printer driver 110 is installed in the Non-PC 100. Here, in order to explain the example concretely, it is assumed that quantization resolution (resolution 1) of the image data processed by the printer driver 110 in the Non-PC 100 is 300 dpi, data resolution (resolution 2) of the image data sent to and processed by the engine unit 310 in the image output apparatus 300 is 600 dpi, and actual recording resolution (resolution 3) on the recording medium is 1200 dpi×600 dpi. In order to achieve easy explanation of the data flow as exclusively focusing on the flow of the data resolution being the feature of the present invention, the details of other entire printer system will be refrained from explanation.

Here, it should be noted that if the resolution is described such as "300 dpi" without any specific designation in the specification, this represents that the horizontal-direction resolution and the vertical-direction resolution are both "300 dpi", while if the resolution is described by the two kinds of numerical values such as "1200 dpi×600 dpi", this represents the variable-magnification resolution in which the horizontal-direction resolution is "1200 dpi" and the vertical-direction resolution is "600 dpi".

Figure 2:
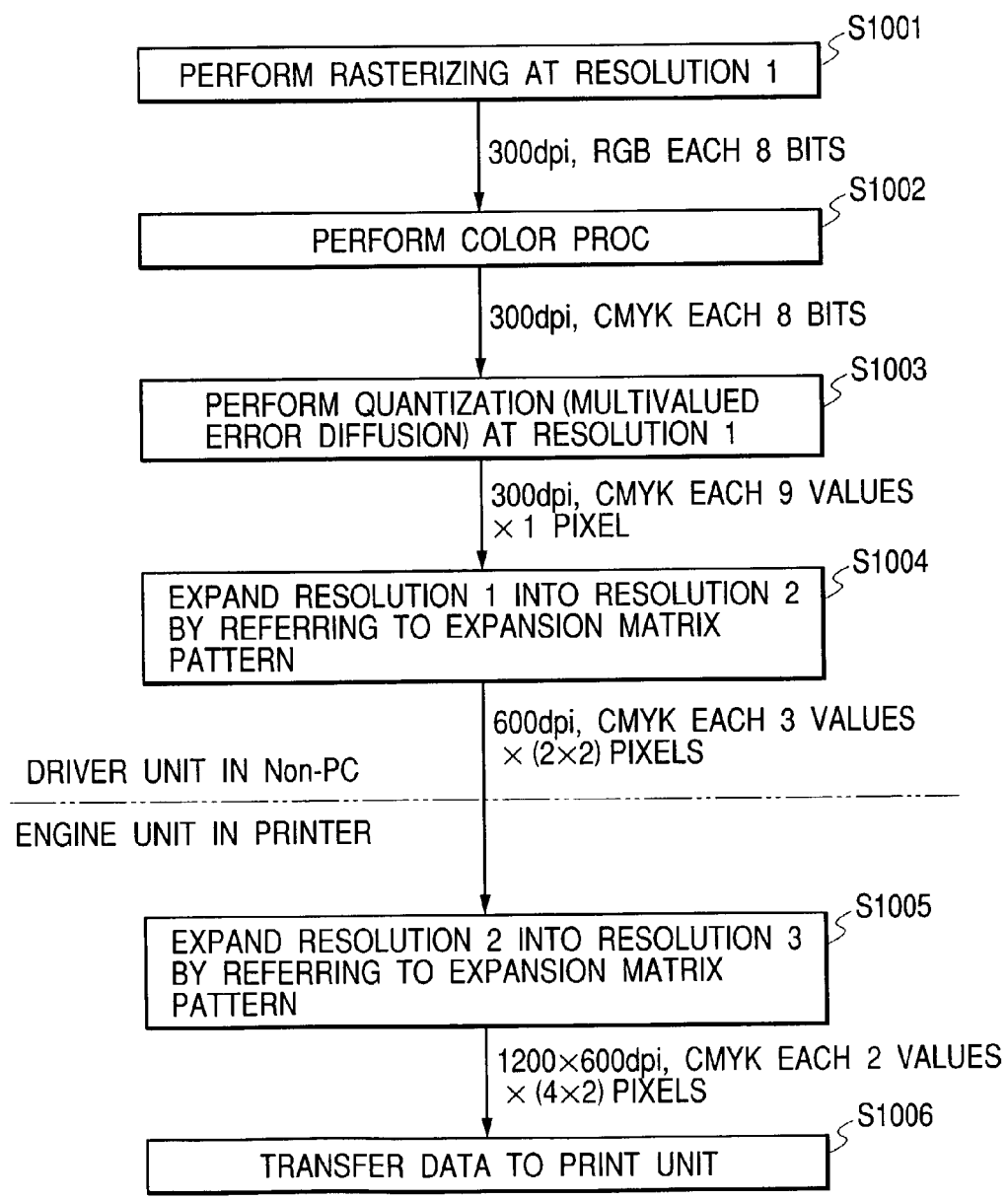
FIG. 2 is a flow chart showing processes of a driver unit and a printer engine unit in a Non-PC system according to the first embodiment.

First, the processes by the printer driver 110 of the Non-PC 100 and the engine unit 310 of the printer 300 will be explained with reference to FIG. 2. FIG. 2 is the flow chart showing the processes by the printer driver 110 of the Non-PC 100 and the engine unit 310 of the printer 300, according to the first embodiment. In FIG. 2, the process by the printer driver 110 of the Non-PC 100 is shown in the upper part of the chain double-dashed line, and the process by the engine unit 310 of the printer 300 is shown in the lower part of the chain double-dashed line.

In a step S1001 of FIG. 2, the printer driver 110 of the Non-PC 100 performs rasterizing of the image data at the resolution 1 (300 dpi) to generate the image data for each of R (red), G (green) and B (blue) by eight bits in relation to each pixel of 300 dpi. Next, in a step S1002, the printer driver 110 of the Non-PC 100 performs a color process to the image data necessary to the information processing system. Here, it should be noted that the color process in this case includes an input gamma correction process, a conversion process of R, G and B data into R', G' and B' data to correct a difference between a color space in the Non-PC 100 and a color space in the printer 300, a conversion process of the R', G' and B' data into C (cyan), M (magenta), Y (yellow) and K (black) data corresponding to the components of coloring materials used in the printer 300, an output gamma correction process, and other general color conversion processes, and further includes a color conversion process to appropriately represent the colors of the image shot by a digital camera (not shown). Incidentally, the data thus obtained is the image data for each of C, M, Y and K by eight bits in relation to each pixel of 300 dpi.

In a step S1003, the printer driver 110 of the Non-PC 100 performs multivalued quantization (error diffusion) to the obtained data to generate the multivalued image data of nine values for each of C, M, Y and K in relation to each pixel of 300 dpi. Then, in a step S1004, the printer driver 110 of the Non-PC 100 converts the obtained data into the four pixels of the three-valued data of each of C, M, Y and K in relation to each pixel of 600 dpi (resolution 2) in accordance with the output multivalued level of 300 dpi (resolution 1). That is, in this step, the data of the one pixel of 300 dpi is expanded into the data of the four pixels of 600 dpi by referring to an expansion matrix pattern.

The data generated by the printer driver 110 of the Non-PC 100 is transferred, as the discrete data in relation to each pixel, to the engine unit 310 of the printer 300 through an I/F such as a USB or the like. In this case, typically, the data generated in the step S1004 is compressed by a means of some kind, the compressed data is transferred to the engine unit 310 of the printer 300, and the transferred data is decompressed (or uncompressed) by the engine unit 310 (such a series of processes is not shown). In a step S1005, the engine unit 310 of the printer 300 further converts the multivalued (three values) image data of the resolution 2 (600 dpi) into the binary data of each of C, M, Y and K in relation to each pixel of 1200 dpi×600 dpi so that the obtained image data can be printed by the print unit 320. Then, in a step S1006, the obtained data is transferred to and actually printed by the print unit 320. That is, the data quantized at 300 dpi in relation to each pixel by the printer driver 110 of the Non-PC 100 is expanded into the data of the four pixels of 600 dpi, the expanded data is transferred to the engine unit 310 of the printer 300, the transferred data is further expanded into the data of the eight pixels of 1200 dpi×600 dpi, and then the expanded data is printed.

Next, a pattern form at each resolution in case of expanding the data will be explained with reference to FIG. 3. First, in relation to the nine-valued data (output data 0 to 8 shown in the left column of FIG. 3) after the quantization at 300 dpi in the step S1003, it is understood how the output value of 300 dpi expanded in the step S1004 is output in relation to 600 dpi. That is, the data of the one pixel of 300 dpi is expanded into the data of the four pixels of 600 dpi, and the three-valued data (output data 0 to 2 shown in the middle column of FIG. 3) of the one pixel of 600 dpi is obtained. Further, in the information processing system according to the present embodiment, the engine unit 310 of the printer 300 which is structured to be able to process the three-valued data converts the obtained three-valued data into the print data of 1200 dpi×600 dpi (shown in the right column of FIG. 3) in the step S1005. That is, the one pixel of 600 dpi is expanded into the two pixels of 1200 dpi×600 dpi, and thus the binary data (0 or 1) is obtained in relation to the one pixel. In this case, since the expansion method according to a known matrix recording method is used to expand the resolution 2 into the resolution 3, the detailed explanation of the expansion method will be omitted here.

A multivalued level M of the resolution 1 is basically determined according to two parameters, that is, one is an expansion (or magnifying) ratio L of the resolution 1 and the resolution 2 (in the present embodiment, vertical-direction magnification (600 dpi/300 dpi)×horizontal-direction magnification (600 dpi/300 dpi)=4 (quadruple)) and the other is a multivalued level N in relation to each pixel at the resolution 2 (this parameter is determined by the expansion according to the known matrix recording method, and corresponding to the specification in the engine unit 310). Thus, the multivalued level M of the resolution 1 can be expressed as M=L×N+1. However, there is a possibility that the multivalued level M becomes smaller than the value obtained by the above expression because any negative effect does not appear on the image, or contrarily, the higher multivalued level M becomes necessary because a negative effect appears on the image. This is based on the concept same as that in case of setting the number of multivalued levels in the expansion method according to the known matrix recording method, and is thus applied to the expansion method from the resolution 1 to the resolution 2 according to the present embodiment. The above expression shows the above basic concept but is not limited to this, that is, the expression is treated as one of design parameters.

Next, the operation and the effect of the present embodiment as compared with the known matrix recording method will be explained. In the information processing system according to the present embodiment, a printer engine which has previously included the known matrix recording method for expanding the three-valued data of 600 dpi into the binary data of the two pixels of 1200 dpi×600 dpi is assumed as the engine unit 310 of the printer 300. Thus, in the present embodiment, a load or the like in the data transfer from the printer driver 110 of the Non-PC 100 to the engine unit 310 of the printer 300 is reduced by utilizing the previously included matrix recording method.

Moreover, although the three-valued data of 600 dpi for the matrix recording method is subjected to the processes such as the rasterizing process, the color process, the quantization process and the like by an ordinary PC driver at 600 dpi, the three-valued data of 600 dpi is subjected to the processes such as the rasterizing process, the color process, the quantization process and the like by the printer driver 110 of the Non-PC 100 at 300 dpi lower than 600 dpi in case of transferring the data to the engine unit 310 of the printer 300, whereby the load of the image processing unit in the printer 300 is further reduced (¼). Then, the matrix pattern for expanding the resolution from 300 dpi to 600 dpi has been previously prepared in the printer driver 110 of the Non-PC 100 to convert the image data into the processable data in the engine unit 310 of the printer 300 and then transfer the converted data to the engine unit 310.

In the information processing system according to the present embodiment, the image data is quantized by the printer driver 110 of the Non-PC 100 at 300 dpi, the quantized image data is transferred to the engine unit 310 of the printer 300 at 600 dpi, and the transferred image data is recorded by the print unit 320 at 1200 dpi×600 dpi. As apparent from FIG. 3, in each image data conversion, the density information can be maintained within the area of 300 dpi, whereby image deterioration can be controlled in the minimum. Thus, as compared with the known matrix recording method in the conventional PC printer driver, it is possible to achieve the high-speed process, the reduction of the load, the high-speed image data transfer from the printer driver 110 of the Non-PC 100 to the engine unit 310 of the printer 300, and the high-quality recording in the print unit 320. Therefore, it is possible to achieve the performance equivalent to that of the conventional PC printer driver even under the circumstance that the Non-PC having the smaller-capacity memory and the lower-speed CPU is used.

Moreover, in the conventional matrix recording method, it is thought that 81 combinations ($3^4$: three values per pixel in relation to four pixels) are necessary to process the pixel corresponding to 300 dpi. However, in the present embodiment, it is apparent from FIG. 3 that only the nine combinations are used to represent 300 dpi. This indicates that, according to the present embodiment, a substantial compression ratio is improved in the data compression for transferring the image data to the engine unit 310 of the printer 300, whereby it is possible to achieve the high-speed image data transfer as compared with the conventional matrix recording method.

Furthermore, it is explained in the present embodiment that the resolution 1 in the printer driver 110 of the Non-PC 100 is 300 dpi. However, in the actual Non-PC system, this resolution does not necessarily become the same for the same printer. That is, since the environments called the Non-PC are various, all of these environments do not necessarily have some operation systems and certain levels of memory speed and CPU speed like the ordinary PC. In other words, the environment called the Non-PC is not necessarily assumed as the printer. It is sufficiently supposed that the data treated in the Non-PC environment is not necessarily premised on the printer, and the reduction of the process by about ¼ is insufficient because the Non-PC environment is further severe.

In relation to such various conditions, in the conventional matrix recording method, it is necessary, on the side of the engine unit of the printer, to prepare the matrix expansion patterns of various resolutions and patterns according to the various conditions. Moreover, even if the various conditions have been previously expected and thus several kinds of matrix expansion patterns have been prepared, the environment insufficient for these patterns might occur. Thus, it is in fact impossible to cope with this environment only by utilizing the known matrix recording method.

However, according to the matrix recording method in the present embodiment, it only has to prepare at least one kind of expansion matrix pattern in the printer 300. On the other hand, the expansion matrix pattern of the resolution 1 and the expansion matrix pattern for expanding the resolution 1 into the resolution 2, which are used in the printer driver 110 of the Non-PC 100, are appropriately prepared in the Non-PC 100 in consideration of the difference due to the system environments, whereby it is possible to cope with the engine unit 310 of the printer 300 without any change, and thus to increase the Non-PC environments to which the printer 300 is connected.

Incidentally, it is apparent from the above explanation that the resolutions 1, 2 and 3 and the expansion matrix pattern for the conversion between the resolutions in the present embodiment are not limited to those described as above. The important point is that the processing resolution in the printer driver 110 of the Non-PC 100 is at least lower than the resolution in the image data transfer to the engine unit 310 of the printer 300, whereby the processing load can be reduced as compared with the known matrix recording method. Moreover, as explained above, the expansion matrix pattern for especially expanding the resolution 1 into the resolution 2 may be set according to the magnification uniquely determined from the relation between the resolutions 1 and 2 and the multivalued level receivable by the engine unit 310 of the printer 300.

Furthermore, the information processing system according to the present embodiment is explained by utilizing the method which is achieved in the Non-PC system. However, for example, in a PD printer system such as having an image processing unit in the controller unit of the printer, the information processing system according to the present embodiment can be achieved by performing the process of the printer driver 110 of the Non-PC 100 at the controller unit of the printer. Even in this case, it is possible to similarly expect the effect of the present invention that the processing load in the controller unit of the printer can be reduced and the data transfer between the controller unit and the engine unit of the printer can be effectively performed. Moreover, in this case, since the matrix expansion method according to the matrix recording method inherently provided in the engine unit of the base printer is utilized, the change of the engine unit of the printer can be kept to the minimum, whereby the printer can achieve the sufficient performance even as an add-on PD printer.

Furthermore, even if the above control is achieved in the driver unit of the PC printer, it is possible to similarly expect the effect of the present invention that the processing load in the driver unit of the printer can be reduced and the data transfer between the driver unit and the engine unit can be effectively performed. Furthermore, if the print data generation method according to the present invention and the known print data generation method are selectively changed on the actually used PC in accordance with the performance and environment of the PC such as the CPU processing speed, the capacity of the installed memory, the amount of parallel processes, and the like, it is possible to provide on the PC a more agreeable print environment for the user.

Figure 4:
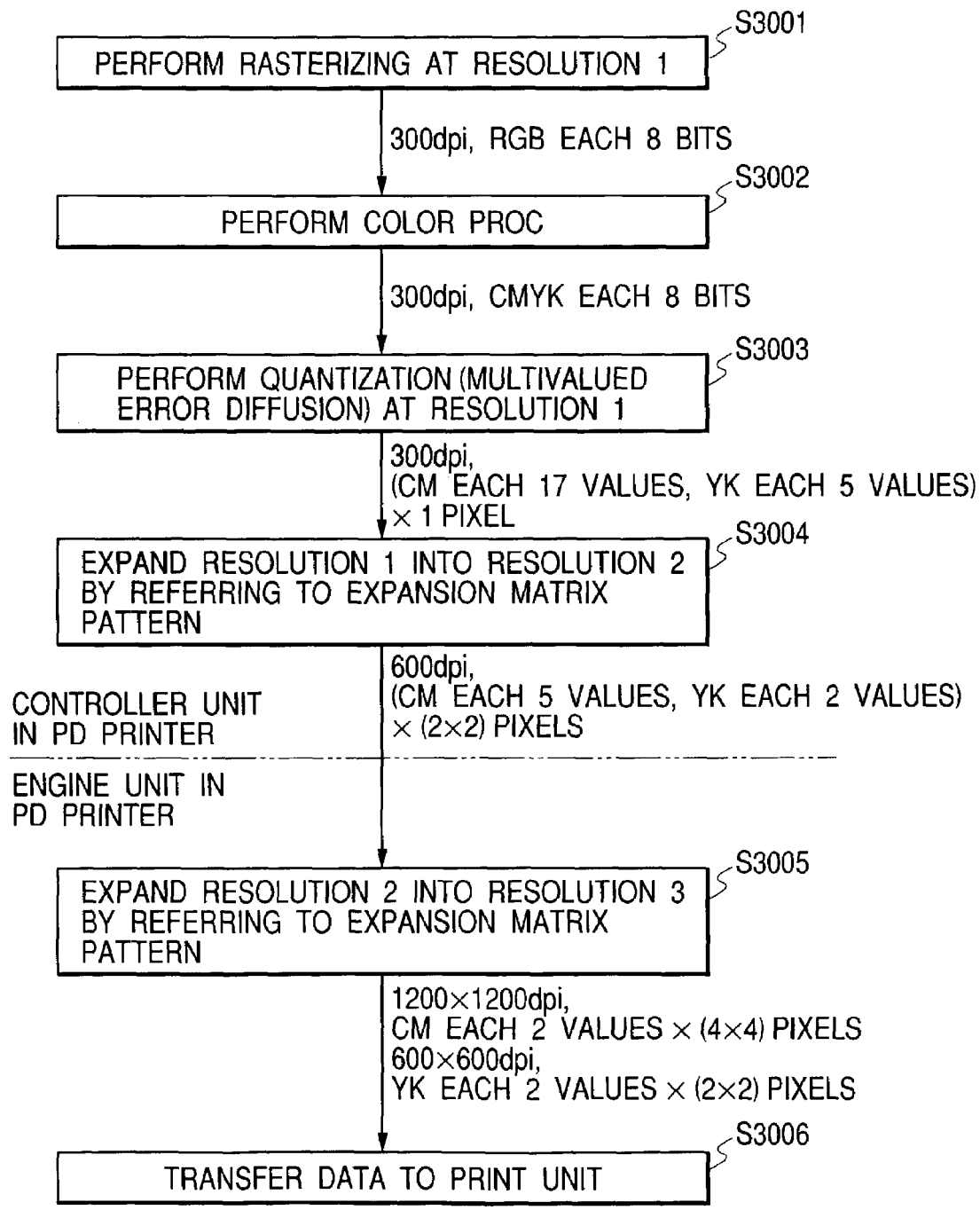
FIG. 4 is a flow chart showing processes of a controller unit and an engine unit in a PD printer according to the first embodiment.
Figure 5:
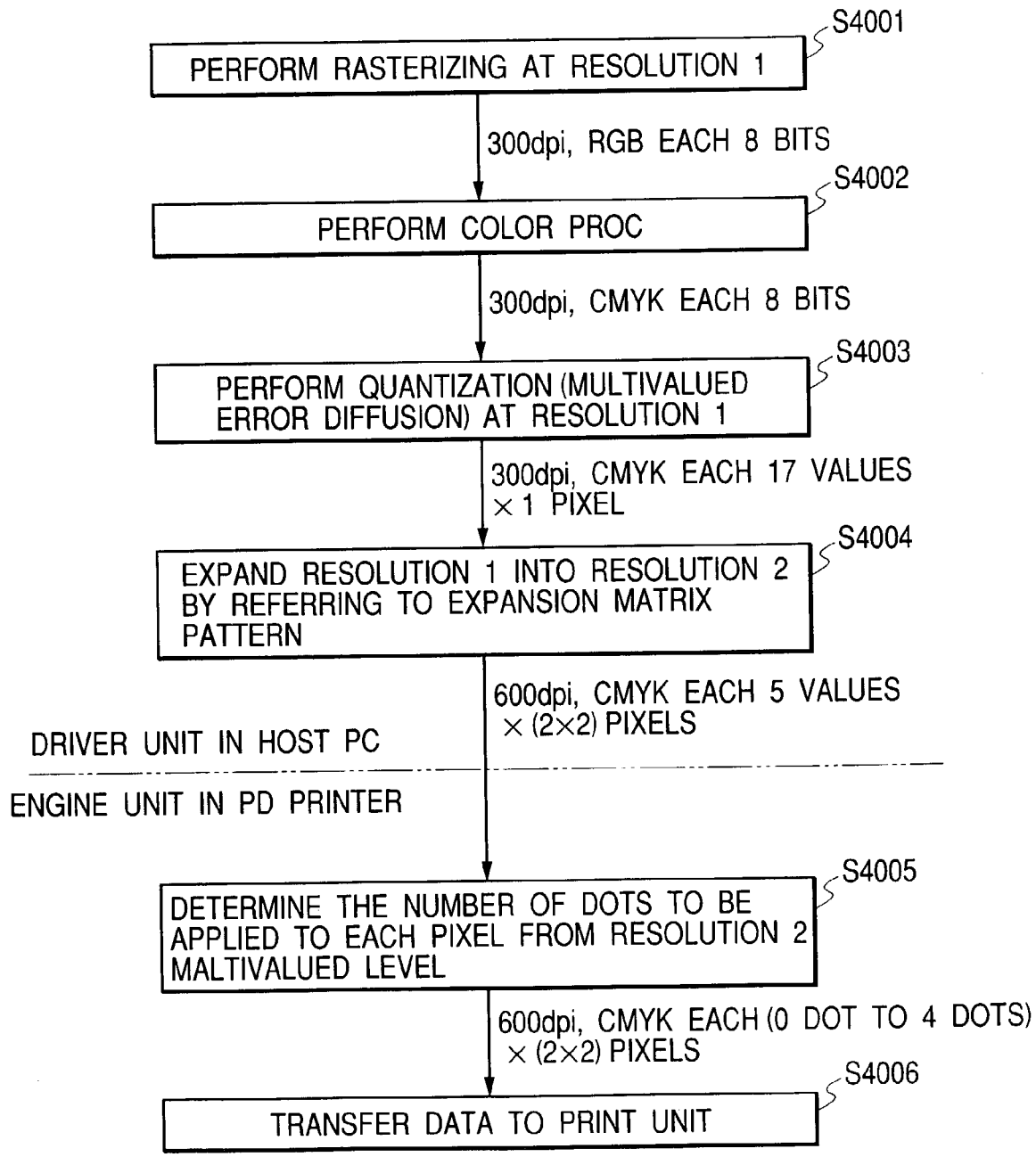
FIG. 5 is a flow chart showing processes of a driver unit in a host PC and the printer engine unit in the PD printer according to the first embodiment.

Incidentally, FIG. 4 is the flow chart showing the case where the processes shown in FIG. 2 are performed in the controller unit and the engine unit of the PD printer, and FIG. 5 is the flow chart showing the case where the processes shown in FIG. 2 are performed in the printer driver unit of the host PC and the printer engine unit of the PD printer. Furthermore, steps S3001 to S3006 shown in FIG. 4 are basically the same as the steps S1001 to S1006 shown in FIG. 2, and steps S4001 to S4004 and S4006 shown in FIG. 5 are basically the same as the steps S1001 to S1004 and S1006 shown in FIG. 2. However, in a step S4005 of FIG. 5, a process to determine the number of dots to be applied to each pixel from the resolution 2 multivalued level is performed.

As explained above, according to the first embodiment, the processing load in the image processing unit of the image data resource can be reduced, whereby it is possible to provide the image output capable of maintaining the image quality and the speed (i.e., overall speed including image processing speed, data transfer speed and print speed) even under the circumstance that there is no sufficient memory and high-speed CPU. Moreover, it is possible to provide the image output capable of maintaining the image quality and the speed (i.e., overall speed including image processing speed, data transfer speed and print speed) according to the matrix recording method which flexibly copes with the various environments and minimizes the load in the engine unit of the printer. In particular, it is possible to provide an inexpensive PD printer system as reducing the processing load in the system and minimizing the change in the engine unit.

Second Embodiment

In the above first embodiment of the present invention, the quantization resolution in the printer driver, the transfer resolution from the printer driver to the engine unit of the printer, and the print resolution are all the same (in common) for each of the used colors. On the other hand, it will be explained in the second embodiment a case where a quantization resolution in a printer driver, a transfer resolution in data transfer from the printer driver to an engine unit of a printer, and a print resolution are different for each color. In the engine unit of the printer according to the present embodiment, five-valued data of 600 dpi is received in relation to C and M, and the received data is expanded into four pixels of 1200 dpi and binary-recorded. On the other hand, binary data of 600 dpi is received for Y and K, the received data is binary-recorded for one pixel of 600 dpi as it is.

Figure 6:
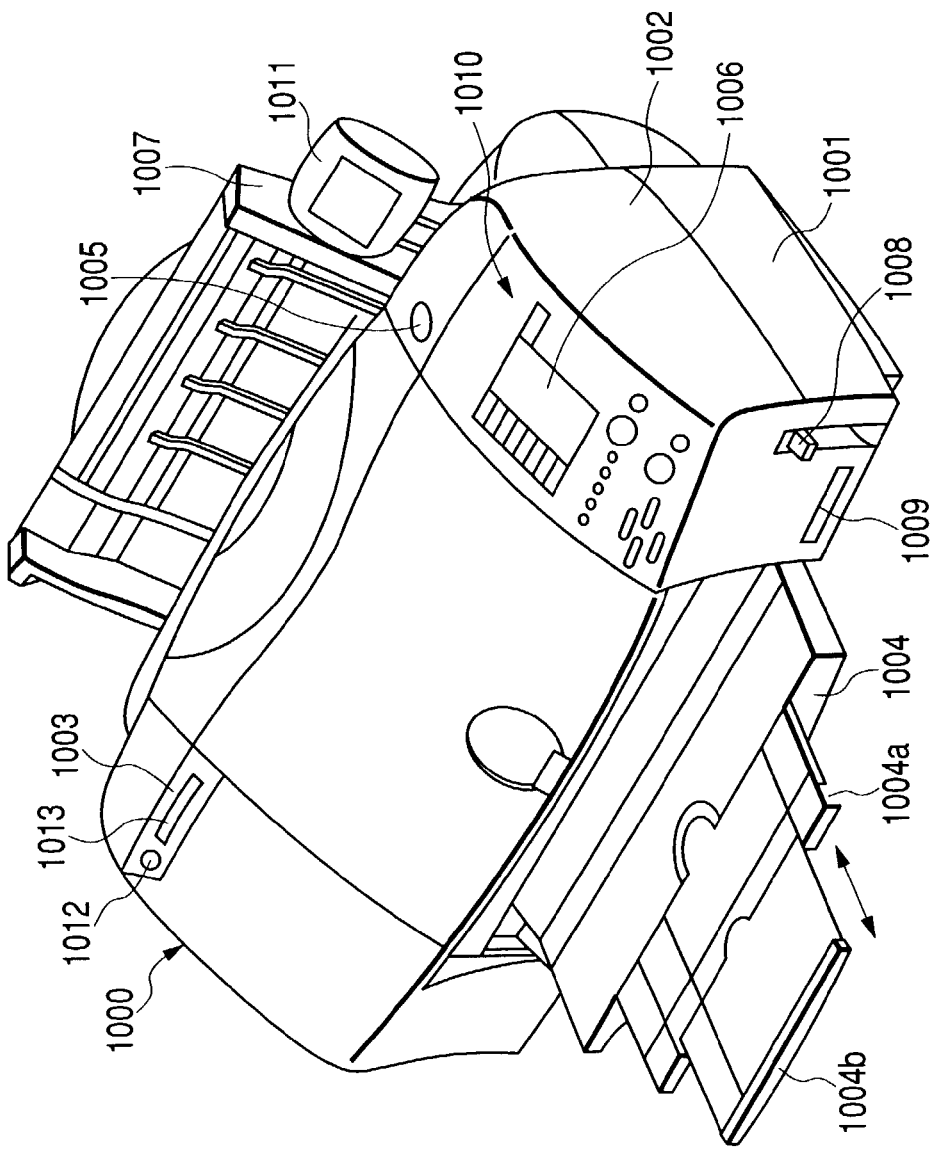
FIG. 6 is a perspective view showing an external appearance of a PD printer according to the second embodiment of the present invention.

Next, a PD printer according to the second embodiment will be explained with reference to FIGS. 6 to 11. FIG. 6 is the perspective view showing the external appearance of a PD printer 1000 according to the present embodiment. The PD printer 1000 includes a function as an ordinary PC printer to receive data from a host PC and print the received data, and a function to directly read and print image data stored in a storage medium such as a memory card or receive and print image data sent from a digital camera.

In FIG. 6, the body of the PD printer 1000 has exterior parts consisting of a lower case 1001, an upper case 1002, an access cover 1003 and a discharge tray 1004. The lower case 1001 substantially forms the lower half portion of the body, the upper case 1002 substantially forms the upper half portion of the body, the combination of the lower and upper cases 1001 and 1002 forms a hollow structure which includes a containing space for containing later-described respective mechanisms, and openings are provided respectively on the lower and upper cases 1001 and 1002.

One edge of the discharge tray 1004 is pivotally supported by the lower case 1001, whereby the opening on the front of the lower case 1001 is opened and closed by the discharge tray 1004. Thus, in case of performing a recording operation, the discharge tray 1004 is rotated frontward to open the opening, whereby papers can be discharged through the opening and then the discharged papers are sequentially stacked. Moreover, if each of two auxiliary trays 1004a and 1004b contained in the discharge tray 1004 is drawn frontward as needed, the paper supporting area can be enlarged and reduced by three levels.

Moreover, one end of the access cover 1003 is pivotally supported by the upper case 1002 so that the opening on the to surface of the case is opened and closed. Thus, by opening the access cover 1003, a recording head cartridge (not shown), an ink tank (not shown) or the like contained in the body of the printer can be manually exchanged. Here, although it is not specifically shown in the drawing, when the access cover 1003 is opened and closed, a projection provided on the back side of the cover rotates a cover open/close lever, whereby the open/close state of the access cover 1003 can be detected by detecting the rotation position of the lever by using a microswitch or the like.

Furthermore, a depressible power supply key 1005 is provided on the top surface of the upper case 1002. Furthermore, an operation panel 1010 which includes a liquid crystal display unit 1006, various key switches and the like is provided on the right of the upper case 1002, and the structure of the operation panel 1010 will be explained in detail with reference to FIG. 8. An automatic paper feeding unit 1007 automatically feeds a recording paper (also called a recording sheet) into the body of the PD printer 1000, and a lever 1008 is used to adjust an interval between the recording head and the paper. An adapter capable of being equipped with the memory card is inserted into a card slot 1009, whereby the image data stored on the memory card can be directly fetched in and then printed by the body of the printer through the adapter. Here, for example, a CompactFlash™ memory, Smartmedia™, Memory Stick™ and the like can be used as the memory card.

A viewer (liquid crystal display unit) 1011 is detachable to the body of the PD printer 1000. For example, when an image intended to be printed is retrieved or searched from among plural images stored in the PC card, the viewer 1011 is used to display the image of each frame, an index image and the like. A terminal 1012 is used to connect the later-described digital camera, and a USB connector 1013 is used to connect a later-described PC.

Figure 7:
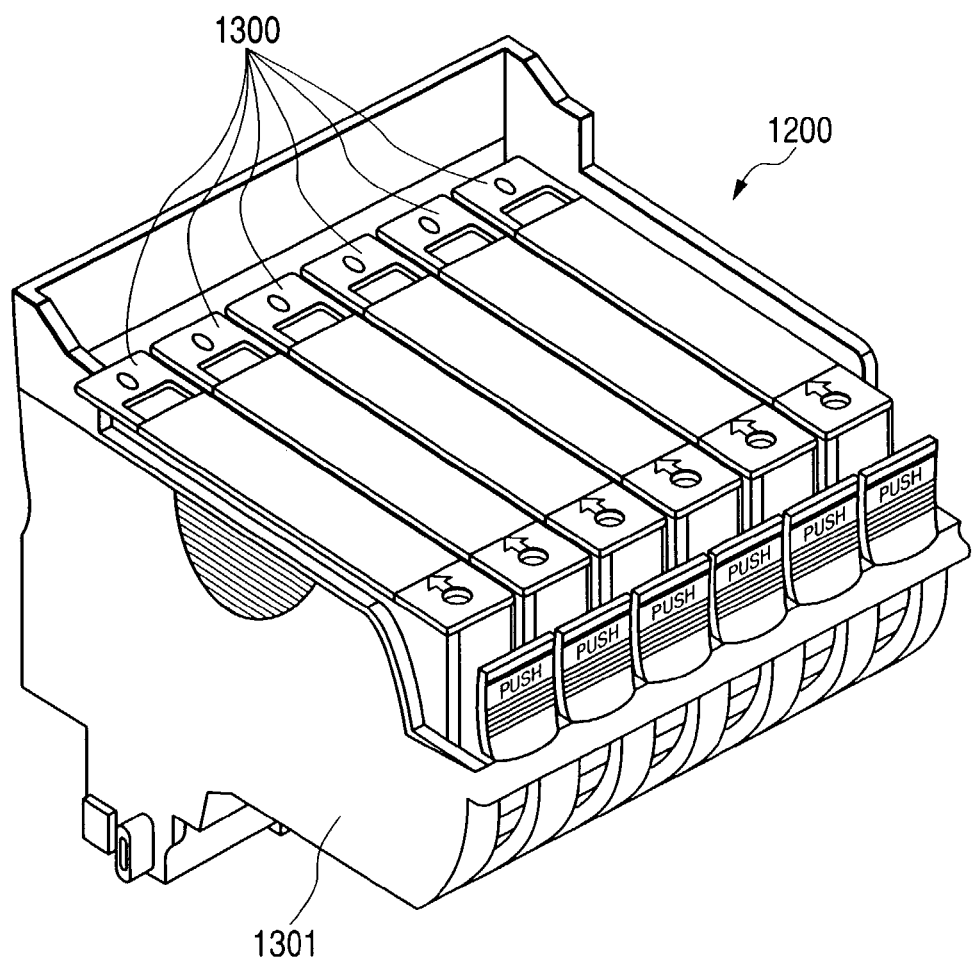
FIG. 7 is a perspective view showing an external appearance of a recording head cartridge of the PD printer according to the second embodiment.

FIG. 7 is the perspective view showing an external appearance of a recording head cartridge 1200 of the PD printer 1000 according to the second embodiment. As shown in FIG. 7, the recording head cartridge 1200 consists of ink tanks 1300 which respectively contain various kinds of inks, and a recording head 1301 which discharges (or emits) the inks supplied from the ink tanks 1300 through respective nozzles in accordance with recording information. As the recording head 1301, a so-called cartridge recording head which is detachably mounted on a carriage is adopted. When the recording is performed, the recording head cartridge 1200 is reciprocated along the carriage shaft to record a color image on the paper.

In order to be able to photographically record a high-quality color image, for example, the ink tanks 1300 for black, light cyan (LC), light magenta (LM), cyan, magenta and yellow inks are independently provided in the recording head cartridge 1200 of FIG. 7, and each ink tank is detachable to the recording head 1301. Although the case where the above six kinds of inks are used will be explained in the present embodiment, the present invention is not limited to this. That is, for example, an ink-jet printer which performs color image recording by using four kinds of inks of black, cyan, magenta and yellow inks may be adopted. In this case, the ink tanks of the four colors may be independently detachable to the recording head 1301.

Figure 8:
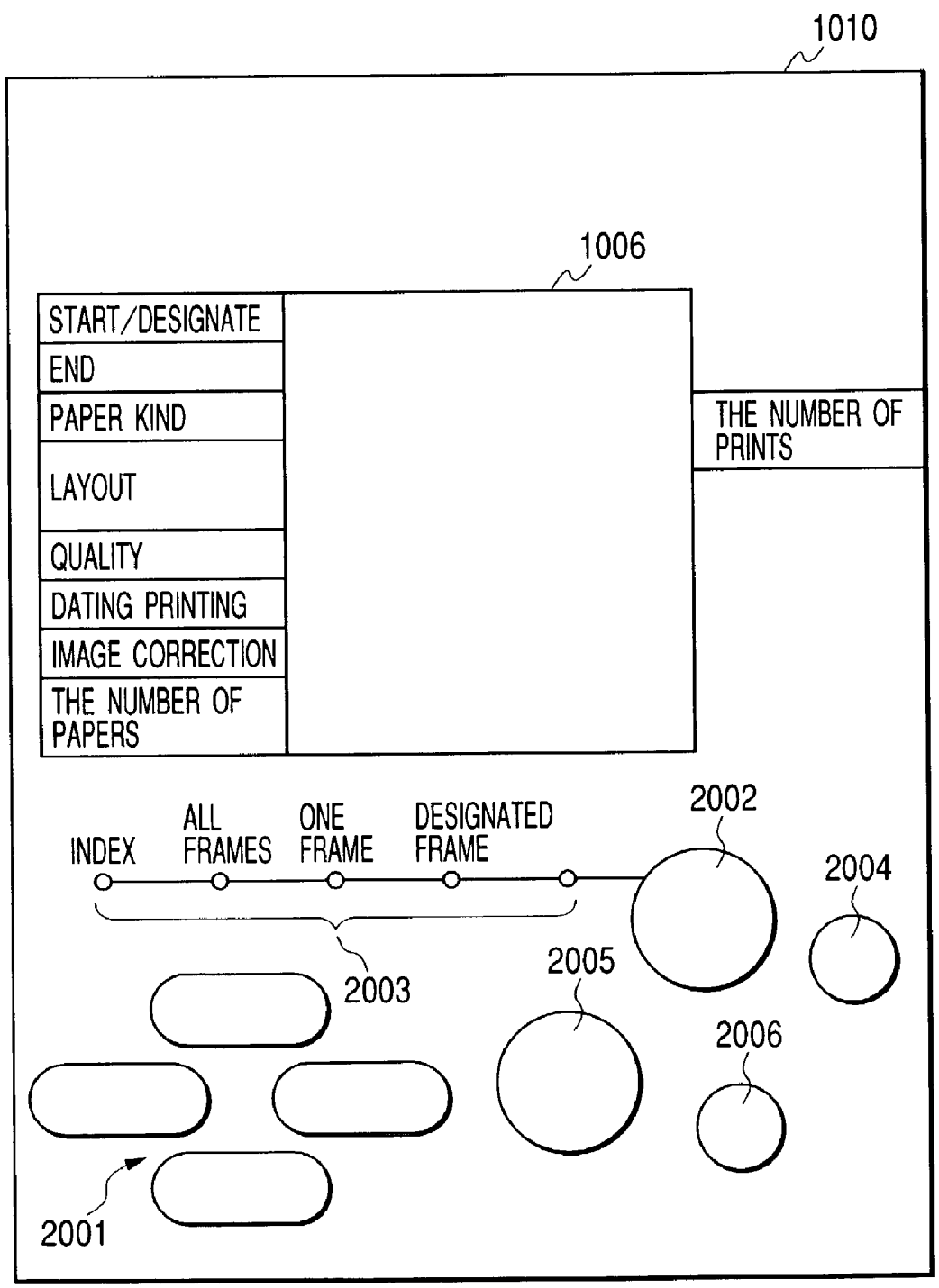
FIG. 8 is a diagram showing the configuration of an operation panel of the PD printer according to the second embodiment.

FIG. 8 is the diagram showing the configuration of the operation panel 1010 according to the present embodiment. In FIG. 8, the liquid crystal display unit 1006 displays menu items which are used to set various data concerning the items described on the right and left of this unit. Here, the items to be displayed includes a headmost photograph (image) number within a range intended to be printed and a designated frame number (START/DESIGNATE), a last photograph (image) number within a range intended to be print-ended (END), the number of prints (THE NUMBER OF PRINTS), a kind of recording paper (recording sheet) to be used for the printing (PAPER KIND), setting of the number of images to be printed on one recording paper (LAYOUT), designation of print quality (QUALITY), designation as to whether or not shoot date is to be printed (DATING PRINTING), designation as to whether or not a photograph (image) is to be printed after correction (IMAGE CORRECTION), display of the number of papers necessary for the printing (THE NUMBER OF PAPERS), and the like, and these items are selected or designated by using cursor keys 2001.

Every time a mode key 2002 is depressed, the kind of printings (i.e., index printing, all-frame printing, one-frame printing, etc.) can be changed, and a corresponding LED in a LED group 2003 is lit according to the depression. A maintenance key 2004 is used to perform maintenance of the printer such as cleaning of the recording head 1301 or the like, a print start key 2005 is depressed to instruct print start or establish maintenance setting, and a print stop key 2006 is depressed to stop the printing or instruct a stop of the maintenance.

Figure 9:
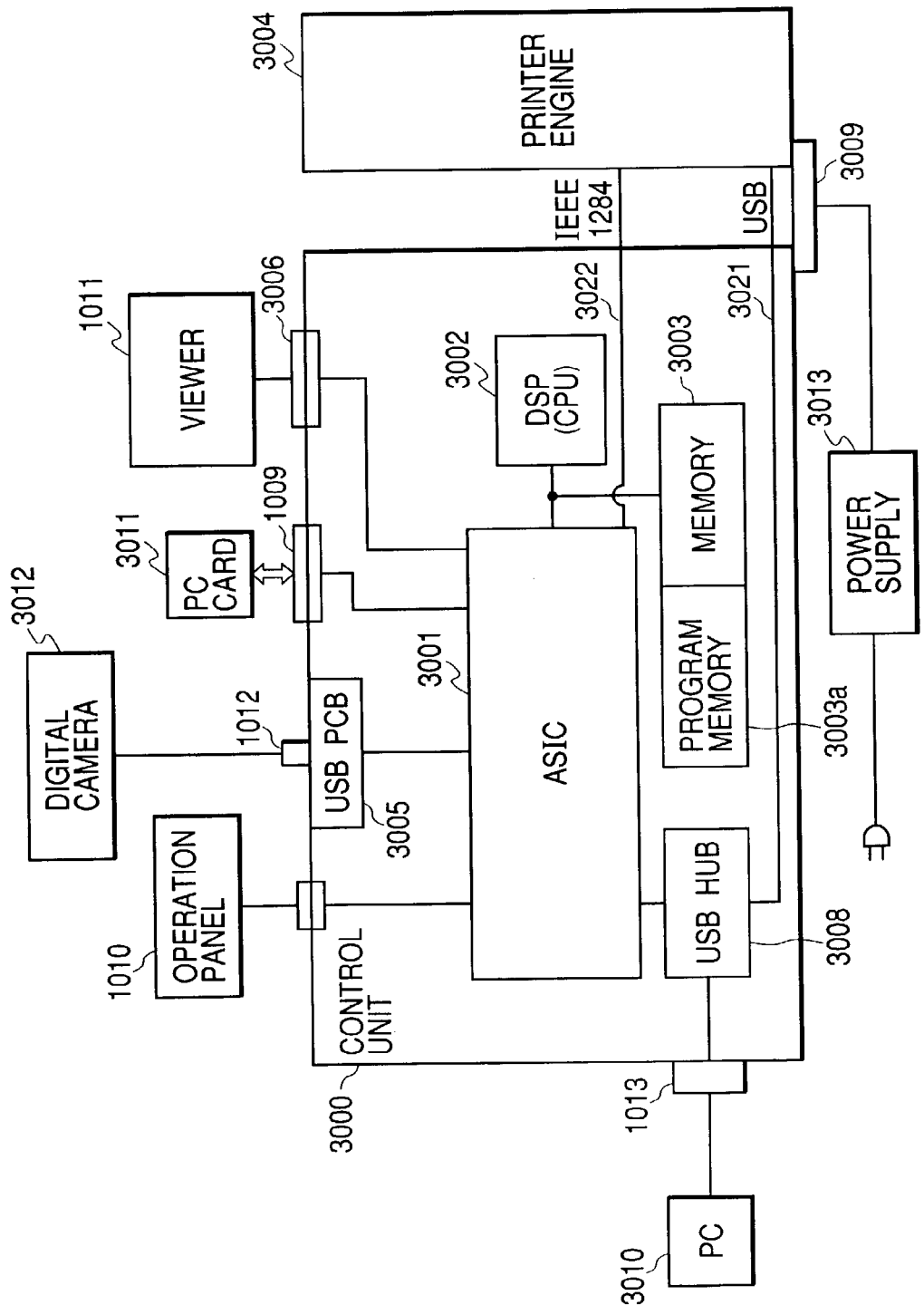
FIG. 9 is a block diagram showing the structure of the main portion concerning control of the PD printer according to the second embodiment.

Next, the structure of the main portion concerning the control of the PD printer 1000 according to the second embodiment will be explained with reference to FIG. 9. FIG. 9 is the block diagram showing the structure based on the control portion of the PD printer 1000 according to the present embodiment. Here, it should be noted that the PD printer 1000 includes the card slot 1009, the operation panel 1010, the viewer 1011, the terminal 1012, the USB connector 1013, a control unit (control substrate) 3000, a printer engine 3004, a connector 3006, a power supply connector 3009, and a power supply 3013. In FIG. 9, numeral 3010 denotes a PC, numeral 3011 denotes a PC card, and numeral 3012 denotes a digital camera. Moreover, in FIG. 9, it is assumed that the components which are common to those in FIGS. 6 and 8 are respectively shown with the numerals same as those in these drawings, and the explanation of these components will be omitted.

In the control unit (control substrate) 3000 of FIG. 9, an ASIC (application specific IC) 3001 which acts as a dedicated custom LSI and of which the structure will be later explained in detail with reference to FIG. 10 includes various interface units. A DSP (digital signal processor) 3002 such as DSP-C6211™ available from Texas Instruments includes a CPU to perform various control processes, and various image processes such as conversion of brightness signals (R, G and B) into density signals (C, M, Y and K), scaling, gamma conversion, error diffusion and the like. In other words, the DSP 3002 is used as a PD controller in the present embodiment. A memory 3003 includes a program memory 3003a for storing control programs of the CPU of the DSP 3002, a RAM area for storing execution programs, and a memory area functioning as a working memory to store image data and the like. Numeral 3004 denotes a printer engine.

As the printer engine 3004, a printer engine for an ink-jet printer which prints a color image by using plural kinds of color inks is provided. A USB bus connector 3005 functions as the port to connect the digital camera 3012 to the PD printer 1000, and the connector 3006 connects the viewer 1011 to the PD printer 1000. A USB hub 3008 gets, in a case where the PD printer 1000 prints image data transferred from the PC 3010, the transferred image data through the hub itself as it is and then outputs the image data to the printer engine 3004 through a USB 3021. Thus, the connected PC 3010 can perform the printing by directly exchanging data and signals with the printer engine 3004 (that is, such a system functions as a general PC printer). A DC voltage converted from a commercial AC voltage is input from the power supply 3013 to the power supply connector 3009.

The PC 3010 which is structured as a general personal computer is connected to the PD printer 1000 through the USB connector 1013. As above, the memory card (PC card) 3011 which stores the image data to be printed by the PD printer 1000 is connected to the PD printer 1000 through the card slot 1009. The digital camera 3012 which can shoot a photogenic subject and store the shot image data is connected to the PD printer 1000 through the terminal 1012 and the USB bus connector 3005.

Here, it should be noted that the signal is exchanged between the control unit 3000 and the printer engine 3004 through the USB 3021 or an IEEE (Institute of Electrical and Electronics Engineers) 1284 bus 3022.

Figure 10:
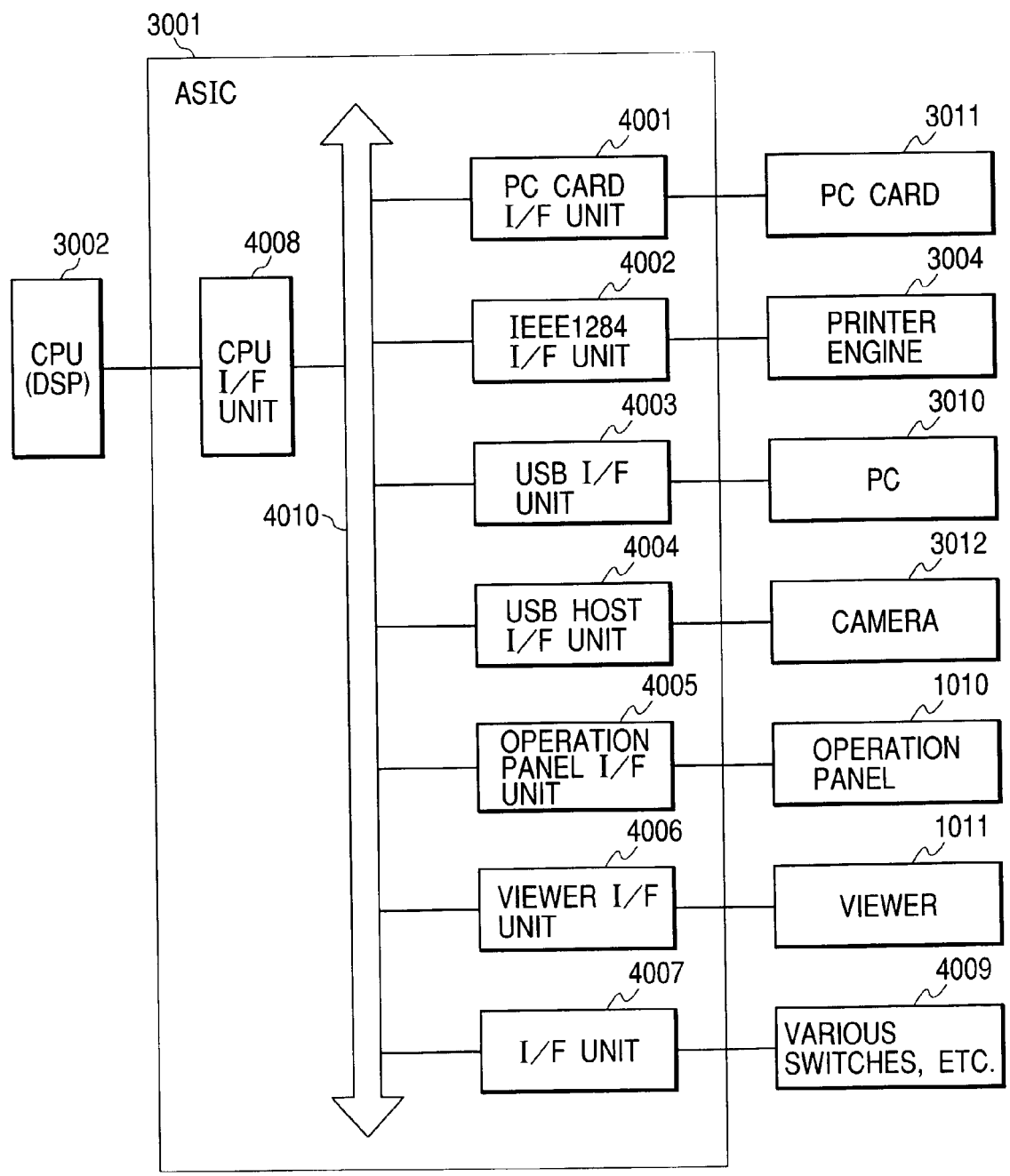
FIG. 10 is a block diagram showing the structure of an ASIC (application specific IC) of the PD printer according to the second embodiment.

FIG. 10 is the block diagram showing the structure of the ASIC 3001 of the PD printer 1000 according to the present embodiment. The ASIC 3001 includes a PC card interface (I/F) unit 4001, an IEEE 1284 I/F unit 4002, a USB I/F unit 4003, a USB host I/F unit 4004, an operation panel I/F unit 4005, a viewer I/F unit 4006, an I/F unit 4007, a CPU I/F unit 4008, and an internal bus (ASIC bus) 4010. In FIG. 10, numeral 3002 denotes the DSP (CPU), numeral 3011 denotes the PC card, numeral 3004 denotes the printer engine, numeral 3010 denotes the PC, numeral 3012 denotes the digital camera, numeral 1010 denotes the operation panel, numeral 1011 denotes the viewer, and numeral 4009 denotes various switches and the like. In FIG. 10, it is assumed that the components which are common to those in the previous drawings are respectively shown with the numerals same as those in these drawings, and the explanation of these components will be omitted.

In FIG. 10, the PC card I/F unit 4001 reads the image data stored in the equipped PC card 3011, and writes data in the PC card 3011. The IEEE 1284 I/F unit 4002 exchanges data with the printer engine 3004, and is used in case of printing the image data stored in the digital camera 3012 or the PC card 3011. The USB I/F unit 4003 exchanges data with the PC 3010, and the USB host I/F unit 4004 exchanges data with the digital camera 3012.

The operation panel I/F unit 4005 inputs various operation signals from the operation panel 1010 and outputs display data to the liquid crystal display unit 1006, the viewer I/F unit 4006 controls to display the image data on the viewer 1011, and the I/F unit 4007 controls the interface with various switches and LED's denoted by numeral 4009. The CPU I/F unit 4008 controls to exchange data with the DSP 3002, and the internal bus (ASIC bus) 4010 connects the above units with others.

Figure 11:
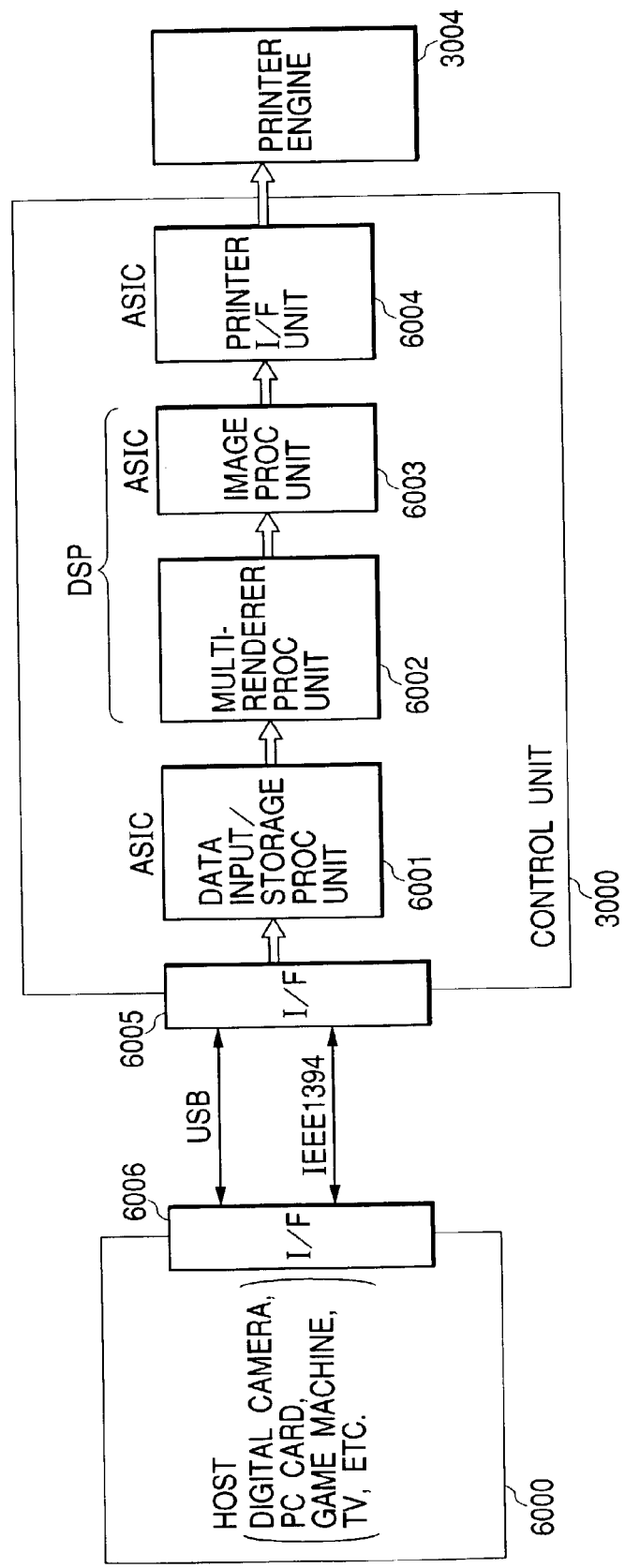
FIG. 11 is a block diagram showing the functional structure concerning interfaces and image processing control of the PD printer according to the second embodiment.

FIG. 11 is the block diagram showing the functional structure concerning the interface and the image processing control of the PD printer 1000 according to the present embodiment. The control unit (control substrate) 3000 of the PD printer 1000 includes a data input/storage processing unit 6001, a MultiRenderer processing unit 6002, an image processing unit 6003, a printer I/F 6004, and an I/F 6005. In FIG. 11, numeral 3004 denotes the printer engine, and numeral 6000 denotes a host which includes an I/F 6006. In FIG. 11, it is assumed that the components which are common to those in the previous drawings are respectively shown with the numerals same as those in these drawings, and the explanation of these components will be omitted.

In FIG. 11, the host 6000 corresponds to a host (image data source) for the PD printer 1000. Here, it should be noted that the host 6000 includes the above PC 3010 acting as the host computer, the digital camera 3012, the PC card (memory card) 3011, a not-shown game machine, a not-shown television and the like. The host 6000 is connected to the PD printer 1000 through an interface such as a USB, an IEEE 1284 bus, an IEEE 1394 bus or the like, or may be connected else through an interface such as Bluetooth™ or the like.

Moreover, the control unit (control substrate) 3000 includes the data input/storage processing unit 6001 which achieved by the ASIC 3001, the printer I/F 6004 which outputs print data to the printer engine 3004, and the MultiRenderer processing unit 6002 and the image processing unit 6003 which are used by the DSP 3002.

First, the image data is read in the PC card being one of the host 6000 by the control unit 3000 of the PD printer 1000 through the I/F's 6006 and 6005, and the read data is stored in the data input/storage processing unit 6001. The stored data is subjected to a MultiRenderer process by the MultiRenderer processing unit 6002 of the DSP 3002 and thus restored, and the restored data is converted into the data processable by the image processing unit 6003. Here, the processing unit 6003 performs the processes same as those to be performed by the PD controller unit (DSP 3002) in FIG. 4 described later.

In these processes, in addition to size conversion/color conversion to be performed by a printer driver of an ordinary host PC, the quantization and the resolution conversion of the quantization result being the characteristics of the present invention are performed. Incidentally, the color process in this case includes, e.g., an image correction process to appropriately represent colors of the image shot by the digital camera, in addition to general color conversion processes such as a conversion process to convert R, G and B signals into R', G' and B' signals for correcting a difference between a former-image color space and a printer output color space, a color conversion process to convert the R', G' and B' signals into C, M, Y and K signals for the components of coloring materials to be used in the printer, an output gamma correction process and the like.

After then, the image data is transferred to the printer engine 3004 through the printer I/F 6004 of the control unit

3000. Although the detailed operation in the printer engine 3004 is not explained specifically, various controls such as motor control in the PD printer 1000, data transfer to the recording head, and the like are performed in known manners to record the image on the recording paper.

In the process of the PD printer 1000 to which the present invention is applied, it is characteristic that the process is performed by using the DSP 3002. In general, the DSP specializes in calculating the sum of products, and more particularly, the high-function DSP which contains the considerable operation elements as in the present embodiment can advantageously perform the parallel operations such as the plural calculations of the sum of products. In particular, the DSP in the present embodiment is suitable for the operations such as a color process, a quantization process and the like which generally impose a burden (or load) on an ordinary processor in case of performing the direct printing.

Next, the print data generation method according to the present embodiment will be explained with reference to FIG. 4. In the steps S3001 and S3002 of FIG. 4, the rasterizing process and the color process same as those in the first embodiment are performed respectively. However, in case of the PD system, the image which is read from the PC card (CF card) 3011 connected to the PD printer 1000 through the card slot 1009 and the image which is read from the digital camera 3012 connected to the PD printer 1000 through the USB bus connector 3005 are used as the original images. Although not shown actually, a preprocess such as a decoding process to generate the image from an original image file such as a JPEG (Joint Photographic Experts Group) image file is further performed before the rasterizing is performed. However, since the preprocess as above is not directly relative to the substance of the present invention, the explanation thereof will be omitted.

The control unit 3000 of the PD printer 1000 generates the image data for each of R, G and B by eight bits in relation to each pixel of the resolution 1 (300 dpi) in the step S3001, and performs the color process to the generated data in the step S3002, thereby obtaining the image data for each of C, M, Y and K by eight bits in relation to each pixel of 300 dpi. In the step S3003, the control unit 300 performs the multivalued quantization (error diffusion) to the obtained data. In this case, it should be noted that the multivalued level in relation to each pixel of 300 dpi is different according to the color, that is, the multivalued data of 17 values is generated for each of C and M, and the multivalued data of five values is generated for each of Y and K. Then, in the step S3004, in accordance with the output multivalued level of 300 dpi (resolution 1), the control unit 3000 converts the obtained data into the five-valued data for each of C and M and the binary data for each of Y and K in relation to the four pixels each having 600 dpi (resolution 2) by referring to the expansion matrix pattern. That is, in this step, the data of the one pixel of 300 dpi is expanded into the data of the four pixels of 600 dpi.

The data generated by the control unit 3000 is transferred, as the discrete data in relation to each pixel, to the printer engine 3004 through an internal I/F such as a USB or the like. In the step S1005 of FIG. 2, the printer engine 3004 further converts the multivalued (four values) image data of the resolution 2 (600 dpi) into the four-pixel binary data of each of C and M in relation to 1200 dpi×600 dpi so as to be printed by the print unit. On the other hand, in the step S1006, the printer engine 3004 transfers, as it is, the binary data of 600 dpi for each of Y and K to the print unit for the printing. That is, the data quantized at 300 dpi in relation to each pixel is expanded into the data of the four pixels of 600 dpi, the expanded data is transferred to the printer engine 3004, the transferred data is further expanded into the data of the 16 pixels of 1200 dpi×1200 dpi for each of C and M, and then the expanded data is printed. For each of Y and K, the print data of 600 dpi can be printed by the printer engine 3004 as it is, whereby the data is expanded into the data of the four pixels and then printed.

As explained above, according to the second embodiment, it is possible to reduce the processing loads in the color process and the quantization process in the control unit 3000 as compared with the known matrix recording method. Furthermore, it is similarly possible to expect the effective data transfer between the control unit 3000 and the printer engine 3004. At this time, since the matrix expansion in the matrix recording method inherently provided in the printer engine 3004 of the printer being the base is utilized in the present embodiment, the change to the printer engine 3004 can be minimized, whereby the printer can achieve the sufficient performance even as an add-on PD printer.

Third Embodiment

Although the case where the data output form to the printer engine and the data expansion by the printer engine into the recording data are performed by utilizing the known matrix recording method is explained in the above first and second embodiment, other methods will be explained in the third embodiment. That is, in the present embodiment, a case to assume, as a printer engine of a printer, a printer engine which receives multivalued data of 600 dpi and discharges a large number of ink droplets of levels 0 to n' according to the multivalued data of 0 to n' into the same pixel of 600 dpi to form an image will be explained, and also a case to assume, as a host PC, a device which transfers the multivalued data of 600 dpi to the printer engine will be explained. In the printer engine of such a type, the number of any of levels 0 to n' in relation to each pixel applied to the engine unit does not need to coincide with the number of ink droplets actually discharged to each pixel. For example, there is a case where, in relation to the four-valued input data of levels 0, 1, 2 and 3 of each pixel is input to the engine unit, the numbers of discharged ink droplets to each pixel are respectively 0, 1, 2 and 4. However, it is needless to say that this is merely a design choice in each printer and is not particularly relative to the intention of the present invention.

In the steps S4001 and S4002 of FIG. 5, the rasterizing process and the color process same as those in the first and second embodiments are performed respectively. The control unit of the host PC generates the image data for each of R, G and B by eight bits in relation to each pixel of the resolution 1 (300 dpi) in the step S4001, and performs the color process to the generated data in the step S4002, thereby obtaining the image data for each of C, M, Y and K by eight bits in relation to each pixel of 300 dpi. Then, in the step S4003, the printer driver unit of the host PC performs the multivalued quantization (error diffusion) to the obtained data to generate the multivalued data of 17 values of 600 dpi for each color. Subsequently, in the step S4004, in accordance with the output multivalued level of 300 dpi (resolution 1), the printer driver unit of the host PC converts the obtained data into the five-valued data for each color in relation to the four pixels each having 600 dpi (resolution 2) by referring to the expansion matrix pattern. That is, in this step, the data of the one pixel of 300 dpi is expanded into the data of the four pixels of 600 dpi.

The data generated by the printer driver unit of the host PC is transferred, as the discrete data in relation to each pixel of 600 dpi, to the printer engine in the printer through an I/F such as the USB or the like. In the step S4005, the printer engine determines the number of ink droplets to be applied to the pixel of 600 dpi as maintaining the resolution 2 (600 dpi), by referring to a predetermined LUT (look-up table), so as to enable the print unit to perform the printing. Then, in the step S4006, the data is transferred to the print unit and thus printed. That is, the data quantized at 300 dpi in relation to each pixel is expanded into the data of the four pixels of 600 dpi, and the expanded data is transferred to the printer engine. Furthermore, in the printer engine, the number of ink droplets to be applied at 600 dpi is determined, whereby the printing is performed.

As explained above, according to the present embodiment, since the data which is processed at 600 dpi in the ordinary printing method of the printer driver unit in the host PC can be processed at 300 dpi, it is possible to reduce the processing loads and also expect the effective data transfer between the control unit of the host PC and the printer engine of the printer.

Other Embodiments

The present invention may be applied to a system which consists of plural devices or to an apparatus which includes only a single device. It is needless to say that the process of the above embodiments can be achieved in a case where a medium such as a storage medium storing the program codes of software to achieve the functions of the above embodiments is supplied to a system or an apparatus, and then a computer (or CPU or MPU) in the system or the apparatus reads and executes the program codes stored in the storage medium.

In this case, the program codes themselves read from the storage medium achieve the functions of the above embodiments, whereby the medium such as the storage medium storing the program codes constitutes the present invention. As the medium such as the storage medium for supplying the program codes, for example, a Floppy™ disk, a hard disk, an optical disk, a magnetooptical disk, a CD-ROM, a CD-R, a magnetic tape, a non-volatile memory card, a ROM, download through networks, or the like can be used.

Furthermore, it is needless to say that the present invention includes not only a case where the functions of the above embodiments are achieved by executing the program codes read by the computer, but also a case where an OS (operating system) or the like functioning on the computer executes all the process or a part thereof according to the instructions of the program codes, thereby achieving the functions of the above embodiments.

Furthermore, it is needless to say that the present invention includes a case where the program codes read from the medium such as the storage medium are once written in a memory provided in a function expansion board inserted in the computer or a function expansion unit connected to the computer, then a CPU or the like provided in the function expansion board or the function expansion unit executes all the process or a part thereof according to the instructions of the written program codes, thereby achieving the functions of the above embodiments.

Furthermore, although the quantization technique based on the error diffusion method is explained in the above embodiments, it is needless to say that the present invention does not intend to limit the quantization to this technique, that is, the known quantization may be utilized. In addition, there is no problem even if the error diffusion method and a dither method are selectively utilized as the quantization technique in accordance with density levels.

As explained above, according to the present invention, the processing load in the image processing unit can be significantly reduced, whereby it is possible to provide the image output capable of maintaining the image quality and the speed (i.e., overall speed including image processing speed, data transfer speed and print speed) even under the circumstance that there is no sufficient memory and high-speed CPU. Moreover, it is possible to provide the image output capable of maintaining the image quality and the speed (i.e., overall speed including image processing speed, data transfer speed and print speed) according to the matrix recording method which flexibly copes with the various environments and minimizes the load in the engine unit of the image recording apparatus. In particular, it is possible to provide an inexpensive PD printer system as reducing the processing load in the system and minimizing the change in the engine unit.

As many apparently and widely different embodiments of the present invention can be made without departing from the spirit and scope thereof, it is to be understood that the invention is not limited to the specific embodiments thereof expect as defined in the appended claims.

What is claimed is:

1. An image processing method comprising:
using a computer to perform the steps comprising:
a quantization step of quantizing input image data of a p value at a first resolution to a q value (where q<p), and generating first image data of the q value at the first resolution;
a first conversion step to acquire second image data of an r value (where r<q) having a second resolution higher than the first resolution, wherein the first conversion step acquires the second image data by converting each pixel of the generated first image data of the q value into any one of patterns in a first pattern group including predetermined plural pixels according to a pixel value of the generated first image data of the q value; and
a second conversion step to acquire third image data of an s value (where s<r) having a third resolution higher than the second resolution, wherein the second conversion step acquires the third image data of the s value by convening each pixel of the second image data of the r value acquired by the first conversion step into any one of patterns in a second pattern group including predetermined plural pixels according to each pixel value of the generated first image data or each pattern of the first pattern group,
wherein, the q value is 3 or more, and
wherein the input image data is color image data including plural color components for each pixel, and said quantization step, said first conversion step and said second conversion step are applied to the image data of each color component, and the image data of all the color components are converted into the third image data having the third resolution.

2. An image processing method according to claim 1, wherein, in the third resolution, the resolution in any one of a horizontal direction and a vertical direction is higher than the second resolution.

3. An image processing method according to claim 1, wherein, in convening the second image data into the third image data, said second conversion step executes the conversion so that the third image data has two values per one pixel.

4. An image processing device comprising:
a quantization unit constructed to execute quantizing input image data of a p value at a first resolution to a q value (where q<p), and generating first image data of the q value at the first resolution;

a first conversion unit constructed acquire second image data of an r value (where r<q) having a second resolution higher than the first resolution, wherein the first conversion unit is constructed to acquire the second image data by convening each pixel of the generated first image data of the q value into any one of patterns in a first pattern group including predetermined plural pixels according to a pixel value of the generated first image data of the q value; and a second conversion unit constructed to acquire third image data of an s value (where s<r) having a third resolution higher than the second resolution, wherein the second conversion unit is constructed to acquire the third image data of the s value by convening each pixel of the second image data of the r value acquired by the first conversion unit into any one of patterns in a second pattern group including predetermined plural pixels according to each pixel value of the generated first image data or each pattern of the first pattern group, wherein, the q value is 3 or more, and wherein the input image data is color image data including plural color components for each pixel, and said quantization unit, said first conversion unit and said second conversion unit process the image data of each color component, and the image data of all the color components are converted into the third image data having the third resolution.

5. An image processing device according to claim 4, wherein, in the third resolution, a resolution in any one of a horizontal direction and a vertical direction is higher than the second resolution.

6. An image processing device according to claim 4, wherein, in converting the second image data into the third image data, said second conversion unit executes the conversion so that the third image data has two values per one pixel.

7. An image processing system which includes a printer driver and an image forming device, wherein said printer driver comprises:

a quantization unit constructed to execute; quantizing input image data of a p value at a first resolution to a q value (where q<p), and generating first image data of the q value at the first resolution; and a first conversion unit constructed to acquire second image data of an r value (where r<q) having a second resolution higher than the first resolution, wherein the first conversion unit is constructed to acquire the second image data by converting each pixel of the generated first image data of the q value into any one of patterns in a first pattern group including predetermined plural pixels according to a pixel value of the generated first image data of the q value, wherein the q value is 3 or more; and wherein said image forming device comprises:

a second conversion unit constructed to receive the second image data of an s value (where s<r) generated by said first conversion unit of the printer driver, and constructed to acquire third image data of the s value having a third resolution higher than the second resolution, wherein the second conversion unit is constructed to acquire the third image data of the r value by converting each pixel of the second image data into any one of patterns in a second pattern group including predetermined plural pixels according to each pixel value of the first image data or each pattern of the first pattern group, and a print unit constructed to effect an image recording operation to a recording medium in accordance with the third image data;

wherein the input image data is color image data including plural color components for each pixel, and said quantization unit, said first conversion unit and said second conversion unit process the image data of each color component, and the image data of all the color components are converted into the third image data having the third resolution.

8. An image processing system according to claim 7, wherein, in the third resolution, a resolution in any one of a horizontal direction and a vertical direction is higher than the second resolution.

9. An image processing system according to claim 7, wherein, in convening the second image data into the third image data, said second conversion unit executes the conversion so that the third image data has two values per one pixel.

10. An image processing system which includes a printer controller and an image forming device, wherein said printer controller comprises:

a quantization unit constructed to execute quantizing input image data of a p value at a first resolution to a q value (where q<p), and generating first image data of the q value at the first resolution; and a first conversion unit constructed to acquire second image data of an r value (where r<q) having a second resolution higher than the first resolution, wherein the first conversion unit is constructed to acquire the second image data by converting each pixel of the generated first image data of the q value into any one of patterns in a first pattern group including predetermined plural pixels according to a pixel value of the generated first image data of the q value, wherein the q value is 3 or more, and wherein said image forming device comprises:

a second conversion unit constructed to receive the second image data of an s value (where s<r) generated by said first conversion unit of the printer controller, constructed to acquire third image data having a third resolution higher than the second resolution, wherein the second conversion unit is constructed to acquire the third image data of the s value by converting each pixel of the second image data of the r value into any one of patterns in a second pattern group including predetermined plural pixels according to each pixel value of the first image data or each pattern of the first pattern group, and a print unit constructed to effect an image recording operation to a recording medium in accordance with the third image data;

wherein the input image data is color image data including plural color components for each pixel, and said quantization unit, said first conversion unit and said second conversion unit process the image data of each color component, and the image data of all the color components are converted into the third image data having the third resolution.

* * * * *